US012654522B2

(12) United States Patent
Bladeck et al.

(10) Patent No.: US 12,654,522 B2
(45) Date of Patent: Jun. 16, 2026

(54) SAFETY DEVICE FOR A VEHICLE, AND VEHICLE

(71) Applicant: Volkswagen Aktiengesellschaft, Wolfsburg (DE)

(72) Inventors: Frank Bladeck, Ribbesbuettel (DE); Rogier Bulsink, Meine (DE); Michael Espich, Velpke (DE); Manuel Hentrich, Dissen am Teutoburger Wald (DE); Jens Kupke, Sassenburg (DE); Gunnar Peters, Wolfsburg (DE); Stefan Weber, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 291 days.

(21) Appl. No.: 18/425,711

(22) Filed: Jan. 29, 2024

(65) Prior Publication Data

US 2024/0166034 A1     May 23, 2024

Related U.S. Application Data

(63) Continuation of application No. PCT/EP2022/071048, filed on Jul. 27, 2022.

(30) Foreign Application Priority Data

Jul. 29, 2021    (DE) ..................... 10 2021 208 182.7

(51) Int. Cl.
    *B60J 5/00*          (2006.01)
    *B60J 5/04*          (2006.01)
    (Continued)

(52) U.S. Cl.
    CPC ........... *B60J 5/0461* (2013.01); *B60J 5/0429* (2013.01); *B60R 21/02* (2013.01); (Continued)

(58) Field of Classification Search
    CPC ....... B60J 5/0461; B60J 5/0429; B60R 21/02; B60R 2021/0006; B60R 2021/0053; B60R 2021/0246
    (Continued)

(56) References Cited

U.S. PATENT DOCUMENTS

| | | | |
|---|---|---|---|
| 4,307,911 A | 12/1981 | Pavlik | |
| 8,061,763 B2 * | 11/2011 | Melz ...................... | B60R 19/00 296/68.1 |

(Continued)

FOREIGN PATENT DOCUMENTS

| | | |
|---|---|---|
| CN | 104507762 A | 4/2015 |
| DE | 3103580 C2 | 10/1986 |

(Continued)

*Primary Examiner* — Steven O Douglas
(74) *Attorney, Agent, or Firm* — Muncy, Geissler, Olds & Lowe, P.C.

(57)          ABSTRACT

A safety device for a vehicle, in particular a motor vehicle, including a door that is movably situated at a body of the vehicle, a crash bolt that protrudes laterally from the body at a retaining section, in the direction of the door, and a recess that is provided at the door and designed to partly accommodate the crash bolt. It is provided that the crash bolt is fastened to the body, and a crash element that extends at least essentially over the length of the door is situated at the door, the crash element being designed to be supported, at a first end thereof having the recess, on the retaining section of the body in the event of a side collision.

10 Claims, 3 Drawing Sheets

(51) Int. Cl.
    *B60R 21/02*         (2006.01)
    *B60R 21/00*         (2006.01)

(52) U.S. Cl.
    CPC ................. *B60R 2021/0006* (2013.01); *B60R 2021/0053* (2013.01); *B60R 2021/0246* (2013.01)

(58) Field of Classification Search
    USPC ...................................................... 296/146.6
    See application file for complete search history.

(56)              References Cited

U.S. PATENT DOCUMENTS

| | | | |
|---|---|---|---|
| 8,882,180 | B2 | 11/2014 | Von Oirschot |
| 10,099,725 | B2 | 10/2018 | Ishii et al. |
| 11,858,331 | B2 * | 1/2024 | Krauth ................... B62D 25/20 |
| 2006/0265961 | A1 | 11/2006 | Winborn et al. |
| 2007/0267239 | A1 | 11/2007 | Engels et al. |
| 2008/0203743 | A1 | 8/2008 | Dekeyser et al. |

FOREIGN PATENT DOCUMENTS

| | | |
|---|---|---|
| DE | 4342038 A1 | 7/1994 |
| DE | 102007063540 A1 | 7/2009 |
| DE | 102009041353 A1 | 4/2010 |
| DE | 102016203339 A1 | 9/2017 |
| FR | 2207039 A1 | 6/1974 |
| GB | 1280395 A | 7/1972 |
| KR | 20070084667 A | 8/2007 |

* cited by examiner

SAFETY DEVICE FOR A VEHICLE, AND VEHICLE

This nonprovisional application is a continuation of International Application No. PCT/EP2022/071048, which was filed on Jul. 27,2022, and which claims priority to German Patent Application No. 10 2021 208 182.7, which was filed in Germany on Jul. 29, 2021, and which are both herein incorporated by reference.

BACKGROUND OF THE INVENTION

Field of the Invention

The invention relates to a safety device for a vehicle, in particular a motor vehicle, including a door that is movably situated at a body of the vehicle, in particular for freeing up and closing a door opening of the body, a crash bolt that protrudes laterally from the body at a retaining section, in the direction of the door, and a recess that is provided at the door and designed to partly accommodate the crash bolt. The invention further relates to a vehicle that includes the safety device.

Description of the Background Art

Safety devices are known from the prior art. For example, Unexamined Patent Application KR 20070084667 discloses a safety device of a motor vehicle in which a crash bolt, present on the body side, cooperates with a recess on the door side to prevent the door from being pressed into the vehicle interior in the event of a lateral impact or a side collision. Due to the engagement of the crash bolt in the recess, the door is additionally retained at the body and prevented from penetrating into the vehicle interior. The recess is formed in a reinforcing plate of the vehicle door, so that the crash bolt cooperates with the reinforcing element in the event of a collision.

SUMMARY OF THE INVENTION

It is therefore an object of the invention to provide an improved safety device which in particular offers increased stability and in particular convenience for a user of the vehicle.

In an example, the invention is characterized in that the crash bolt can be fastened to the body, and a crash element that extends at least essentially over the entire length of the door can be arranged at a door, the crash element being designed to be supported, at a first end thereof having the recess, on the retaining section of the body in the event of a side collision. The safety device according to the invention has the advantage that the crash bolt cooperates with a crash element that extends at least essentially over the entire door length, so that high forces may advantageously be transmitted and reduced without the door deforming into the vehicle interior. As a result of the crash bolt being situated directly at the body or fastened thereto, the crash bolt is also particularly securely mounted on the motor vehicle, and conducts the collision forces directly into the vehicle body. Due to the crash element extending at least essentially over the entire length of the door, i.e., over the entire length or practically the entire length of the door, the crash element extends from one door edge to an opposite or neighboring door edge, thus providing a high level of stability for the door. The door is preferably swivelable at the body, in particular about a vertical or horizontal axis, and/or movably supported.

Furthermore, a trim part can conceal the crash bolt and is penetrable by the crash bolt during a side collision is situated at the body, so that the crash bolt passes into the recess. As a result of the trim part, the crash bolt is thus concealed under normal conditions, which provides an enhanced appearance and also protects the user from being caught on the crash bolt with a part of clothing, such as a coat or the like, when getting in, thereby, or upon subsequent closing of the door, damaging the part of clothing.

Also, an interior trim part can be additionally or alternatively situated at the door, and conceals the crash element and is penetrable by the crash bolt during a side collision, so that the crash bolt passes into the recess. Thus, the recess is also not initially visible and is protected from external influences, for example. The interior trim part thus prevents, for example, small items or dirt from entering the recess, which could subsequently reduce the action of the crash bolt engaging in the recess. The door is also thus protected from water retention and corrosion.

The trim part, at least in the retaining section, can extend at least essentially parallel to the interior trim part of the door. This ensures a tight fit of the door in the region of the retaining section at the body of the motor vehicle.

The crash bolt can have a cutting point, facing the door, for cutting the trim element and/or the interior trim part during a side collision. The cutting point is characterized in particular by a cutting edge or cutting blade that is formed at the free end of the crash bolt.

The cutting point can be designed in one piece with the crash bolt or integrated into the crash bolt. For this purpose, the crash bolt has a wedge shape, for example, at its free end.

The crash bolt can be situated at or near a vehicle pillar. This ensures that high forces may be transmitted into the body of the motor vehicle during a side collision.

The door can be swivelably supported on a first vehicle pillar of the body, and the crash bolt can be situated at a second vehicle pillar of the vehicle. As a result, the crash bolt can be situated at the body at a distance from the swivel bearing of the door, so that side collision forces may be reliably absorbed on the one hand by the swivel bearing, and on the other hand by the crash bolt. In particular, the second vehicle pillar is a vehicle pillar neighboring the first vehicle pillar.

Furthermore, The crash bolt can be situated at the transition of the vehicle pillar to a side member of the body. As a result, the crash bolt can be situated in a region of the body with high load capacity, so that high forces may be absorbed during a lateral impact without the door being pressed into the vehicle interior. In addition, an example in which the door is not swivelable on the first vehicle pillar with the crash bolt situated at the second vehicle pillar, but instead, the vehicle door can be movably supported on the body, for example, in particular on a side member between neighboring vehicle pillars of the body, the crash bolt can be preferably situated at the transition from one of the vehicle pillars to the side member of the body.

The crash element can be oriented at an angle to the side member. Due to the inclined orientation, the crash element extends in particular from the transition region of the vehicle pillar to the side member and to an opposite section of the door, which in particular is situated above the side member, for example at mid-height of the door or between hinges via which the door is swivelably supported on the body. An advantageous force transmission and protective effect are thus ensured.

Furthermore, a vehicle is provided that includes the safety device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
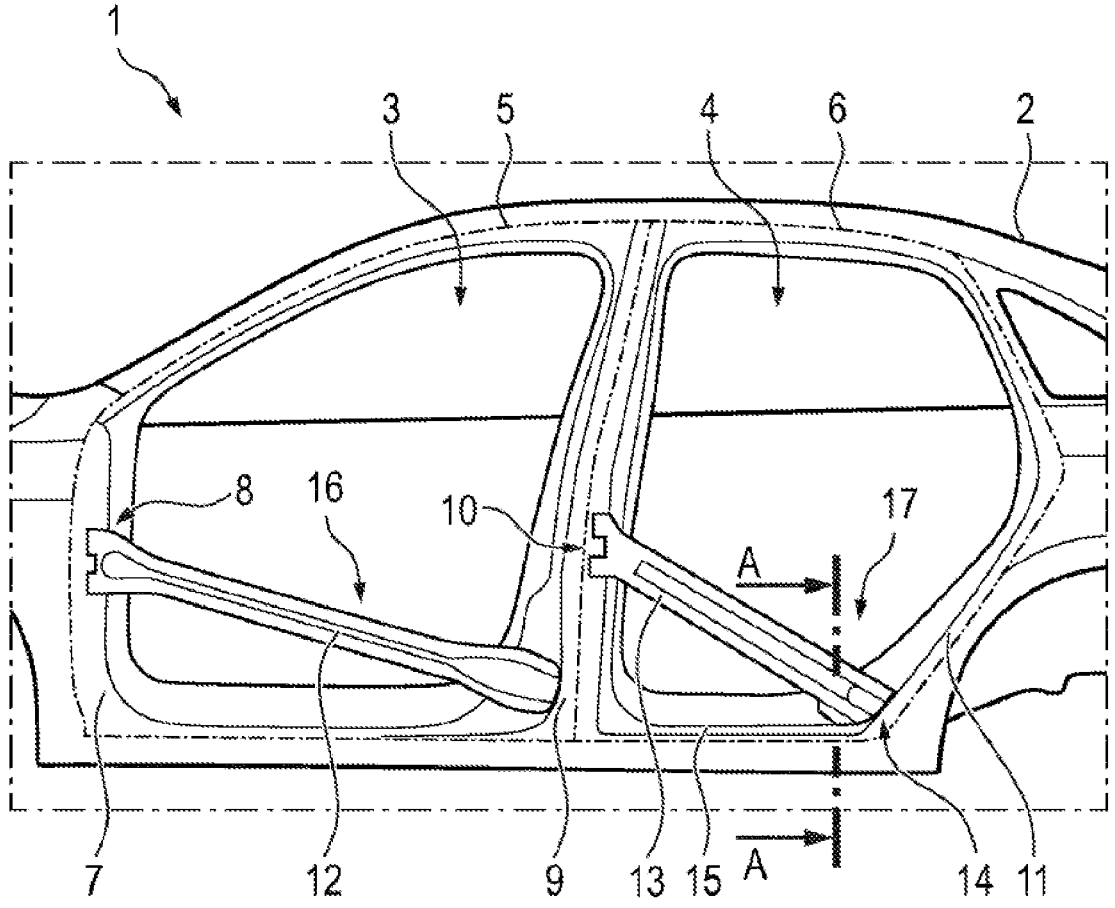
FIG. 1 shows a motor vehicle in a simplified side view.

FIG. 1 shows a simplified side view of a motor vehicle 1, of which essentially only a body 2 is shown here. The body 2 has two frame-shaped door openings 3, 4, with which a door 5 or 6, respectively, is or may be associated. In FIG. 1 the doors 5, 6 are shown to be essentially transparent to allow the advantageous design to be illustrated. The door 5 is swivelably supported on a first vehicle pillar 7, in particular an A-pillar, by one or more swivel joints 8. The door 6 is swivelably supported on a second vehicle pillar 9, in particular a B-pillar, by one or more swivel joints 10. In the closed position of the door 5, it also rests against the second vehicle pillar 9, and in the closed position the door 6 rests against a third vehicle pillar 11, in particular a C-pillar, of the motor vehicle 1 in order to close the particular door opening.

The two doors 5, 6 include a crash element 12, 13, respectively. The crash elements 12, 13 are each designed as crash tubes or crash struts which in each case extend at least essentially over the entire length of the respective door 5, 6. In the closed position of the door, a first end 14 of the crash element 13 is associated with the transition of the vehicle pillar 11 to a side member 15 of the body 2. The crash element 13 thus ends in the bend or in the corner in which the vehicle pillar 11 and the side member 15 meet. The same applies for the crash element 12, which ends at the transition of the vehicle pillar 9 to the side member 15. The crash elements 13, 12 are in particular each oriented at an angle to the side member 15 in such a way that they end with the respective first end 14 at the transition of the particular vehicle pillar 10, 11 to the side member 15, and with the second end at approximately mid-height of the door at the respective opposite vehicle pillar 7, 9. The respective second end of the particular crash element 12, 13 is thus situated at the level of or near to one of the swivel joints 8, 10, or between the swivel joints 8, 10.

The crash elements 12, 13 are part of a safety device 16, 17, respectively, of the motor vehicle 1. Since the safety devices 16, 17 have basically the same design, the design of both safety devices 16, 17 is explained in greater detail below with reference to the safety device 17.

Figure 2:
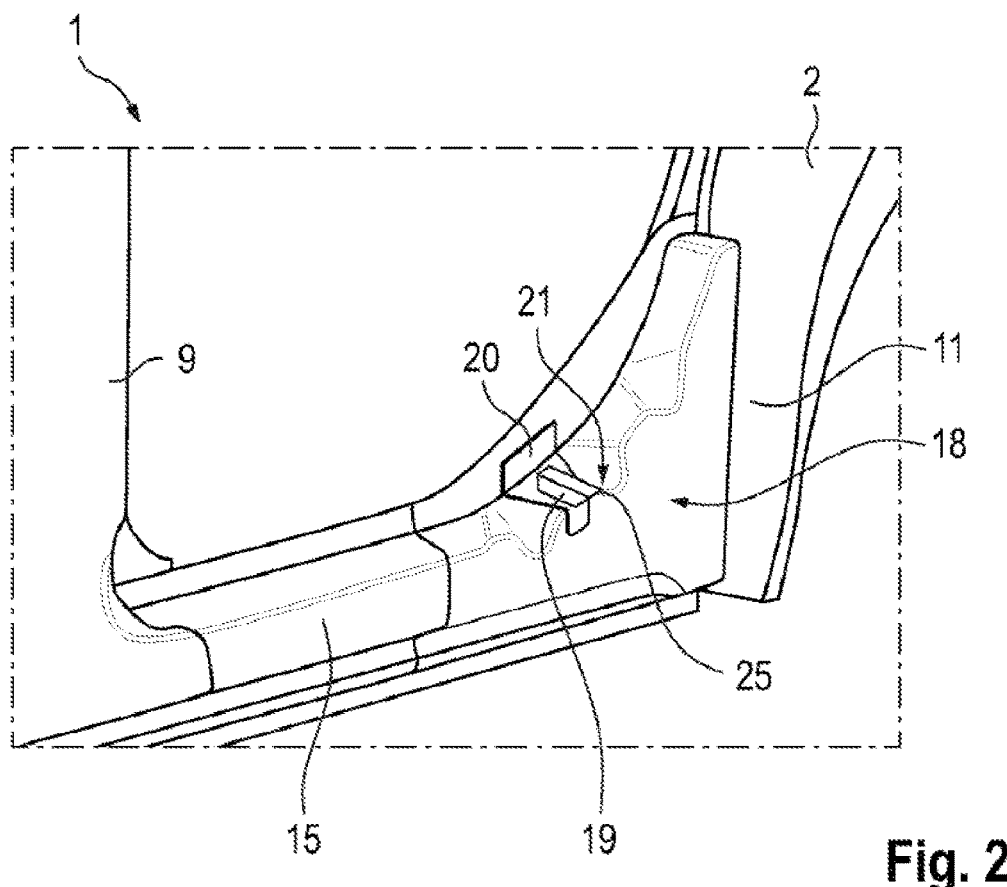
FIG. 2 shows a first detailed view of the motor vehicle.
Figure 4A:
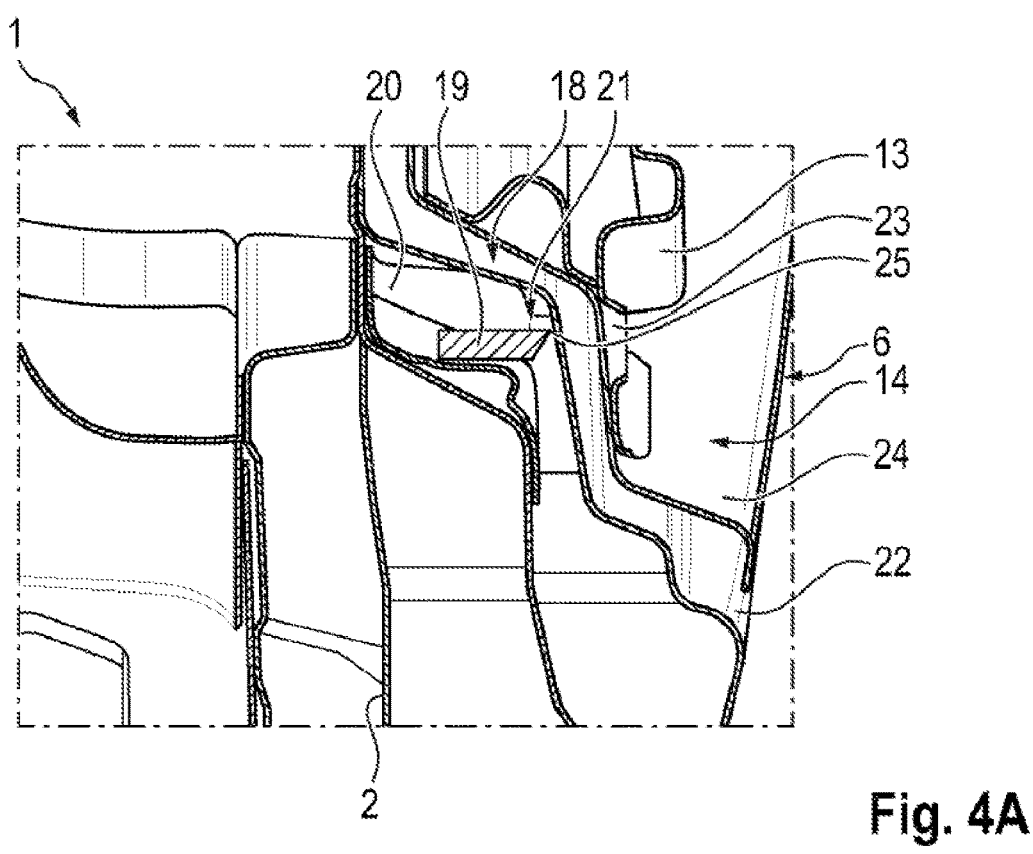
FIGS. 4A and 4B show a sectional illustration of the motor vehicle in the area of an exemplary safety device, in different operating states.

FIG. 2 shows a detailed view of the body 2 of the motor vehicle 1 in a detailed illustration of the safety device 17. The vehicle pillar 11 and the side member 15 are shown. A retaining section 18 of the body 2 is formed in the transition region, and in the closed state of the door 4 is opposite from the first end 14 of the crash element 13. A crash bolt 19 is situated in the retaining section 18. The crash bolt 19 is fastened to the body 2, either directly or with the aid of a reinforcing element 20. The crash bolt 19 protrudes laterally, in particular horizontally, from the body at the retaining section 18 in the direction of the door 6, in particular in the direction of the end 14 of the crash element 13, as shown in FIG. 4A, for example, so that with its free end 21 the crash bolt faces the door 4. The free end 21 is thus spaced apart from the body 2 and protrudes from the retaining section 18.

Figure 3:
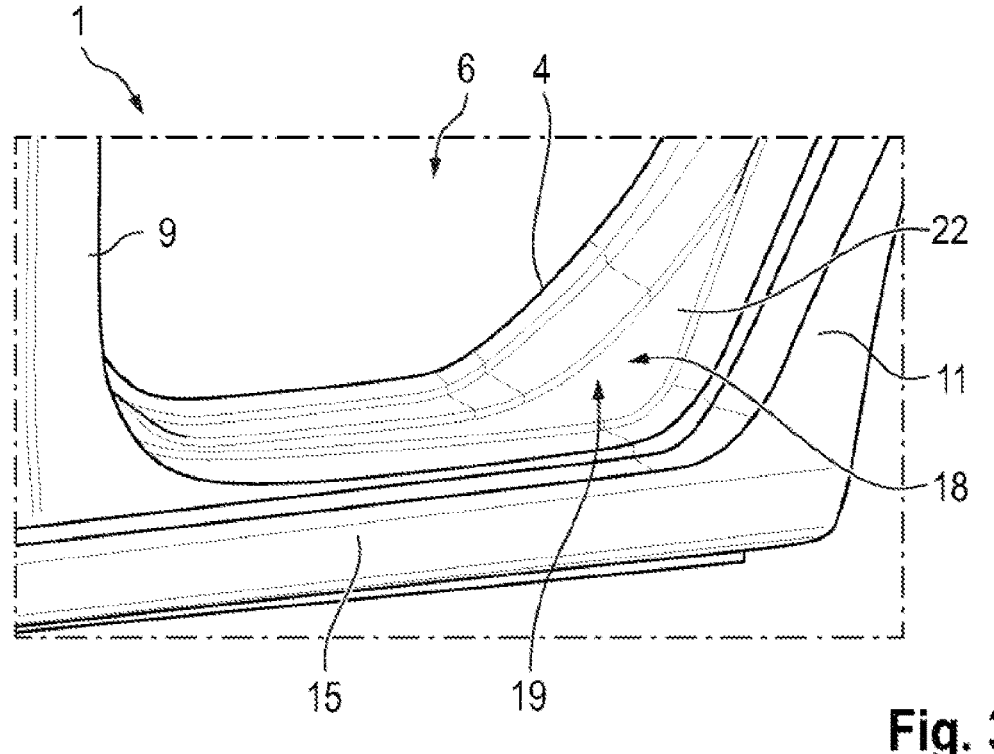
FIG. 3 shows a second detailed view of the motor vehicle.

FIG. 3 shows the same detailed view from FIG. 2, except that now the body 2 is provided with a trim part 22. The trim part 22, in particular the trim panel, covers the body 2 and the crash bolt 19, so that the crash bolt 19 is concealed behind the trim part 22 and thus is not discernible from the outside.

Figure 4B:
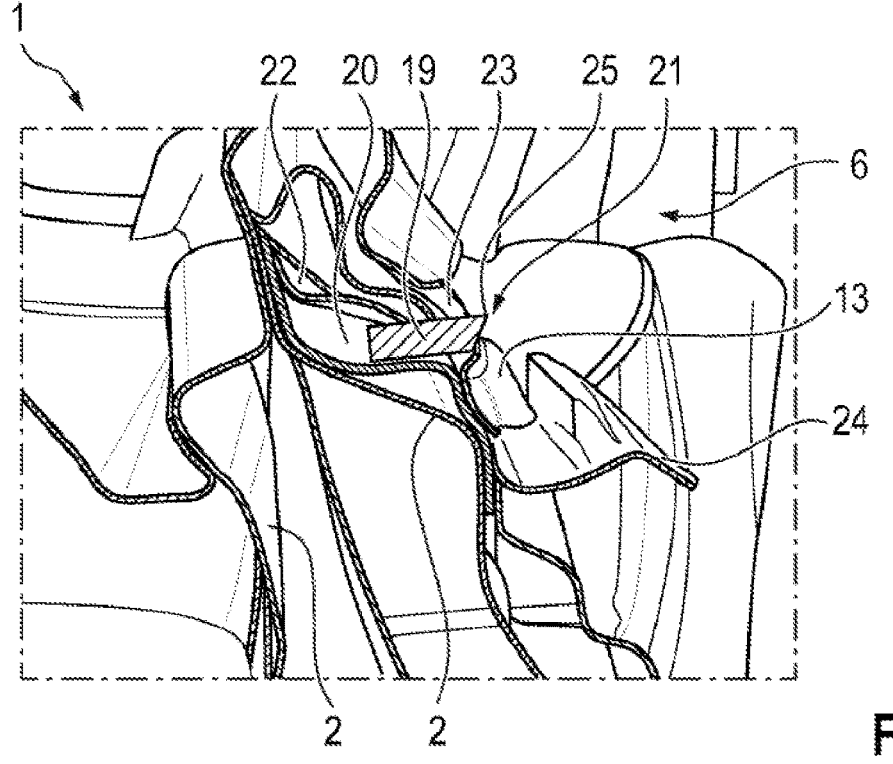

FIGS. 4A and 4B show a sectional illustration along the line A-A from FIG. 1 through the region of the safety device 17, in which the crash bolt 19 is situated. In addition to the body 2, FIG. 4A shows the trim element 22 which conceals the crash bolt 19. For this purpose, the trim element 22, at least in the region of the crash bolt 19, extends at a distance from the retaining section 18, so that the free end 21 of the crash bolt 19 is spaced apart from the trim part 22.

At its end 14 opposite from the crash bolt 19, the crash element 13 has a recess 23, which according to the present example is designed as an opening or aperture in the crash element 13. The recess 23 has an inner contour that is slightly larger than the outer contour of the crash bolt 19. In the closed position of the door 4, the recess 23 is situated opposite from the free end 21 of the crash bolt 19. The door 6 includes an interior trim part 24 that covers and conceals the crash element 13 at the inner side of the door. The interior trim part 24 thus also extends over the recess 23 so that it is not discernible from the outside. The interior trim part 24 extends parallel to the trim element 22 in the region of the retaining section 18, so that the door 6 may be situated particularly close to the body 2 in the closed position. In the closed position, as shown in FIG. 4A, a gap preferably remains between the interior trim part 24 and the trim part 22.

During a side collision or a lateral impact, the following function of the safety device 17 is now provided in the region of the door 6, as shown in particular by FIG. 4B.

FIG. 4B shows by way of example the safety device 17 in the activated or deformed state after a side collision. As a result of the side collision, the door 6 is acted on by a force in the direction of the interior of the motor vehicle 1, thus deforming the door 6. In particular, the crash element 13 is pushed into the vehicle interior, as a result of which the free end 14 is also moved in the direction of the crash bolt 19. If the force generated by the lateral impact is sufficiently high, the crash element 13 is moved and pressed against the retaining section 18 in such a way that the crash bolt 19 cuts through the trim part 22 and the interior trim part 24 and is pushed into the recess 23 of the crash element 13. For this purpose, the crash bolt 19 preferably has a cutting edge 25 at its free end 21 which is designed to cut through the trim part 22 and the trim part 24 during such an impact or side collision. Due to the crash bolt 19 engaging in the recess 23, a form-fit connection is now established between the crash element 13 or the door 6 and the crash bolt 19 or the body 2, via which the door 6 locks against the crash bolt 19 at the end remote from the swivel joint 10, and is prevented from penetrating into the vehicle interior.

The safety device 17 thus ensures that the door 6 cannot be moved into the vehicle interior during a side collision. The risk of injury to vehicle occupants is thus advantageously reduced. Due to the concealed arrangement of the fastening bolt and also of the recess 23, the safety device 17 on the one hand does not become visible, and on the other hand, persons getting in or out cannot be injured, and their clothing cannot be damaged, by the fastening bolt.

Although the present example relates to a swivelable door 6, according to a further example it is provided that the door is movably supported on the body 2 of the vehicle, in particular on the side member 15. At least one crash bolt 19 is then preferably situated in the transition region or at the transition between one of the vehicle pillars 7, 9, 11 and the side member 15.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A safety device for a vehicle, in particular a motor vehicle that comprises a door that is movably arranged at a body of the vehicle, the safety device comprising:

a crash bolt that protrudes laterally from the body at a retaining section, in a direction of the door, the crash bolt being fastened to the body;

a recess that is provided at the door and designed to partly accommodate the crash bolt; and a crash element that extends at least essentially over a length of the door, is arranged at the door, the crash element being supported at a first end thereof having the recess, on a retaining section of the body in an event of a side collision.

2. The safety device according to claim 1, wherein a trim part that conceals the crash bolt and is penetrable by the crash bolt during a side collision is situated at the body so that the crash bolt passes into the recess.

3. The safety device according to claim 1, wherein an interior trim part is arranged at the door and conceals the crash element and is penetrable by the crash bolt during a side collision, so that the crash bolt passes into the recess.

4. The safety device according to claim 1, wherein the trim part, at least in the retaining section, extends at least essentially parallel to the interior trim part of the door.

5. The safety device according to claim 1, wherein the crash bolt has a cutting edge, facing the door, for cutting the trim element and/or the interior trim part during a side collision.

6. The safety device according to claim 1, wherein the crash bolt is arranged at or near a vehicle pillar.

7. The safety device according to claim 1, wherein the door is swivelably supported on a first vehicle pillar, and the crash bolt is arranged at a second vehicle pillar of the vehicle neighboring the first vehicle pillar.

8. The safety device according to claim 1, wherein the crash bolt is arranged at the transition of the vehicle pillar to a side member.

9. The safety device according to claim 1, wherein the crash element is oriented at an angle to the side member.

10. A vehicle, in particular a motor vehicle, that comprises the safety device according to claim 1.

\* \* \* \* \*